United States Patent
He et al.

(10) Patent No.: US 11,581,935 B2
(45) Date of Patent: Feb. 14, 2023

(54) TECHNIQUES TO ENHANCE USER EQUIPMENT (UE) BEAM SCAN

(71) Applicant: QUALCOMM Incorporated, San Diego, CA (US)

(72) Inventors: Ruhua He, San Diego, CA (US); Mihir Vijay Laghate, San Diego, CA (US); Jun Zhu, San Diego, CA (US); Yong Li, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 17/160,954

(22) Filed: Jan. 28, 2021

(65) Prior Publication Data

US 2022/0239361 A1 Jul. 28, 2022

(51) Int. Cl.
*H04B 7/06* (2006.01)
*H04B 17/318* (2015.01)
*H04B 17/336* (2015.01)
*H04L 5/00* (2006.01)
*H04W 24/10* (2009.01)
*H04W 56/00* (2009.01)
*H04W 72/00* (2009.01)

(52) U.S. Cl.
CPC ......... *H04B 7/0695* (2013.01); *H04B 17/318* (2015.01); *H04B 17/336* (2015.01); *H04L 5/0048* (2013.01); *H04W 24/10* (2013.01); *H04W 56/001* (2013.01); *H04W 72/005* (2013.01)

(58) Field of Classification Search
CPC .. H04B 7/0695; H04B 17/318; H04B 17/336; H04L 5/0048; H04W 24/10; H04W 56/001; H04W 72/005
See application file for complete search history.

(56) References Cited

U.S. PATENT DOCUMENTS

| 2019/0349915 A1* | 11/2019 | Ahn ................... H04W 72/0413 |
| 2020/0007222 A1* | 1/2020 | Ruder .................. H04B 7/0837 |
| 2020/0345969 A1 | 11/2020 | Choi et al. |
| 2021/0006986 A1 | 1/2021 | Zhu et al. |

(Continued)

OTHER PUBLICATIONS

International Search Report and Written Opinion—PCT/US2021/064658—ISA/EPO—dated Jun. 28, 2022.

(Continued)

*Primary Examiner* — Eric Myers
(74) *Attorney, Agent, or Firm* — Loza & Loza, LLP

(57) ABSTRACT

A wireless communication device can expedite beam scans for beam management. The wireless communication device can perform a beam scan using a first beam reference signal of a synchronization signal block (SSB) and a second beam reference signal associated with a physical broadcast control channel (PBCH) of the SSB. For each synchronization signal block (SSB) index (e.g., transmit beam) monitored by the wireless communication device, the wireless communication device can obtain a respective beam quality metric on each of two or more respective receive beams using at least the first and second beam reference signals. Other aspects, features, and embodiments are also claimed and described.

24 Claims, 12 Drawing Sheets

(56) References Cited

U.S. PATENT DOCUMENTS

2021/0136703 A1* 5/2021 Kundargi ............ H04W 72/042

OTHER PUBLICATIONS

Huawei., et al., "Beam Management Enhancements for Latency and Overhead Reduction", 3GPP Draft, 3GPP TSG RAN WG1 Meeting #94bis, R1-1810105, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517520, 5 Pages, Retrieved from the Internet: URL: http://www.3gpp.org/ftp/tsg%5Fran/WG1%5FRL1/TSGR1%5F94b/Docs/R1%2D1810105%2Ezip [retrieved on Sep. 29, 2018], Section 4, pp. 2-4 figure 3, the whole document.
Partial International Search Report—PCT/US2021/064658—ISA/EPO—dated May 3, 2022.

\* cited by examiner

| PBCH Payload | Bits | Notes |
|---|---|---|
| SFN | 10 | Entire SFN |
| Half-frame indicator | 1 | Always conveyed explicitly. For frequencies under 3 GHz, additionally in DMRS scrambling. |
| SSB idx | 3 | 3 MSB of SSB Index |
| Raster offset | 4 | Sync/PRB raster offset indication including possibility for different numerology. |
| Default DL numerology | 1 | 15 or 30 kHz for FR1. 60 or 120 kHz for FR2 or above. |
| RSMI config | 8 | All RMSI CORESETs associated with SS blocks within an SSB burst set have the same settings (including time duration) except time-domain location. |
| Front loaded DMRS | 1 | Second or third OFDM symbol in the slot. |
| Cell barring | 1 | From RAN2 |
| Cell reselection | 1 | From RAN 2 |
| Reserved | 2 | |
| CRC | 24 | Same as DCI. |
| Total: | 56 | Agreed |

FIG. 9

TECHNIQUES TO ENHANCE USER EQUIPMENT (UE) BEAM SCAN

TECHNICAL FIELD

The technology discussed below relates generally to wireless communication networks, and more particularly, to beam management in beam-based communication scenarios (e.g., wireless communications using milli-meter wave beams). Some embodiments and techniques enable and provide communication devices, methods, and systems with techniques configured to enhance and expedite UE beam scans, improve system access procedures, and/or mobility for beam-based communications.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. An antenna element in an antenna array can transmit one or more signals combined with other signals of other antenna elements of the same array. This can result in radiated signals at various angles or directions due to constructive interference and destructive interference.

Some base stations and UEs in beam-based communications can select one or more beam pair links (BPLs) for communication. Each BPL can include corresponding transmit and receive beams. In some examples, a UE may select a receive beam for communication with a base station by performing a UE beam scan. During the UE beam scan, the UE obtains a respective beam quality metric of a transmit beam of the base station on each of a plurality of receive beams. A UE may use the beam quality metric to identify a receive beam to pair with a transmit beam. Selection of BPL(s) may occur, for example, during initial acquisition of a cell, during cell reselection, upon detecting a beam failure, during beam refinement, or during beam tracking.

BRIEF SUMMARY OF SOME EXAMPLES

The following presents a summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to some aspects, techniques discussed below enhance and expedite UE beam scans for beam management. A UE can perform the beam scan by utilizing two or more symbols of an SSB. For example, the UE may obtain a respective beam quality metric of a transmit beam of a radio access network (RAN) entity (e.g., a base station) on each of two or more respective receive beams of the UE. The beam quality metrics may be obtained using a secondary synchronization signal (SSS) and a physical broadcast control channel (PBCH)-based beam reference signal of the same SSB. The UE may then communicate with the RAN entity on a beam pair link including the transmit beam and a receive beam selected based on the obtained beam quality metrics. In some examples, the PBCH-based beam reference signal corresponds to a demodulation reference signal (DMRS) of the PBCH. In some examples, the PBCH-based beam reference signal corresponds to a re-encoded PBCH sequence or a re-encoded combined PBCH DMRS and PBCH sequence associated with the PBCH. For example, the re-encoded PBCH sequence (or re-encoded PBCH DMRS and PBCH sequence) may be utilized to de-correlate a received PBCH to obtain the beam quality metric. In this example, the re-encoded PBCH sequence may be acquired using a prior SSB.

In one example, a method for wireless communication at a wireless communication device is disclosed. The method can include obtaining a first beam quality metric associated with a transmit beam of a radio access network (RAN) entity via a first receive beam of a plurality of receive beams of the wireless communication device utilizing a first beam reference signal. The method can further include obtaining a second beam quality metric associated with the transmit beam on a second receive beam of the plurality of receive beams utilizing a second beam reference signal associated with a physical broadcast control channel (PBCH). The first beam reference signal and the second beam reference signal can be associated with a same synchronization signal block (SSB). The method can further include communicating with the RAN entity on a beam pair link including the transmit beam and a receive beam of the plurality of receive beams selected based on at least the first beam quality metric and the second beam quality metric.

Another example provides a wireless communication device in a wireless communication network including a wireless transceiver, a memory, and a processor coupled to the wireless transceiver and the memory. The processor and the memory can be configured to obtain a first beam quality metric associated with a transmit beam of a radio access network (RAN) entity via a first receive beam of a plurality of receive beams of the wireless communication device utilizing a first beam reference signal. The processor and the memory can further be configured to obtain a second beam quality metric associated with the transmit beam on a second receive beam of the plurality of receive beams utilizing a second beam reference signal associated with a physical broadcast control channel (PBCH). The first beam reference signal and the second beam reference signal can be associated with a same synchronization signal block (SSB). The processor and the memory can further be configured to communicate with the RAN entity on a beam pair link including the transmit beam and a receive beam of the plurality of receive beams selected based on at least the first beam quality metric and the second beam quality metric.

Another example provides a wireless communication device in a wireless communication network. The wireless communication device can include means for obtaining a first beam quality metric associated with a transmit beam of a radio access network (RAN) entity via a first receive beam of a plurality of receive beams of the wireless communication device utilizing a first beam reference signal. The wireless communication device can further include means for obtaining a second beam quality metric associated with the transmit beam on a second receive beam of the plurality of receive beams utilizing a second beam reference signal associated with a physical broadcast control channel (PBCH). The first beam reference signal and the second beam reference signal are associated with a same synchronization signal block (SSB). The wireless communication device can further include means for communicating with the RAN entity on a beam pair link including the transmit beam and a receive beam of the plurality of receive beams selected based on at least the first beam quality metric and the second beam quality metric.

Various method, system, device, and apparatus embodiments may also include additional features. For example, the first beam reference signal can include a secondary synchronization signal. In addition, the second beam reference signal can include a demodulation reference signal (DMRS) of the PBCH, a re-encoded PBCH sequence associated with the PBCH, or a re-encoded DMRS and PBCH sequence associated with the PBCH.

In some examples, the method can further include receiving an initial PBCH in a prior SSB, decoding the initial PBCH to produce a modified PBCH payload, re-encoding the modified PBCH payload to obtain a re-encoded PBCH sequence, and de-correlating the PBCH utilizing the re-encoded PBCH sequence to obtain the second beam quality metric.

In some examples, the method can further include receiving an initial PBCH in a prior SSB; decoding the initial PBCH to produce a decoded PBCH; replacing a subframe number, a half-frame indicator, and at least a portion of an SSB index from the decoded PBCH with a predetermined bit sequence to produce a modified PBCH payload, re-encoding the modified PBCH payload to obtain a re-encoded PBCH sequence, and de-correlating the PBCH utilizing the re-encoded PBCH sequence to obtain the second beam quality metric.

In some examples, the method can further include obtaining the second beam quality metric of the transmit beam on the second receive beam of the plurality of receive beams utilizing a first symbol of the second beam reference signal associated with the PBCH, and obtaining a third beam quality metric of the transmit beam on a third receive beam of the plurality of receive beams utilizing a second symbol of the second beam reference signal associated with the PBCH. The method can further include selecting the selected receive beam of the plurality of receive beams based on at least the first beam quality metric, the second beam quality metric, and the third beam quality metric.

In some examples, the first beam quality metric and the second beam quality metric each include a respective reference signal received power (RSRP) or a respective signal-to-interference-plus-noise ratio (SINR). In some examples, the method can further include communicating with the RAN entity on the transmit beam within a millimeter wave frequency band. In some examples, the method can further include communicating with the RAN entity utilizing a numerology selected from a plurality of numerologies.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 9 is a diagram illustrating an example of a PBCH payload according to some aspects.

DETAILED DESCRIPTION

Figure 1:
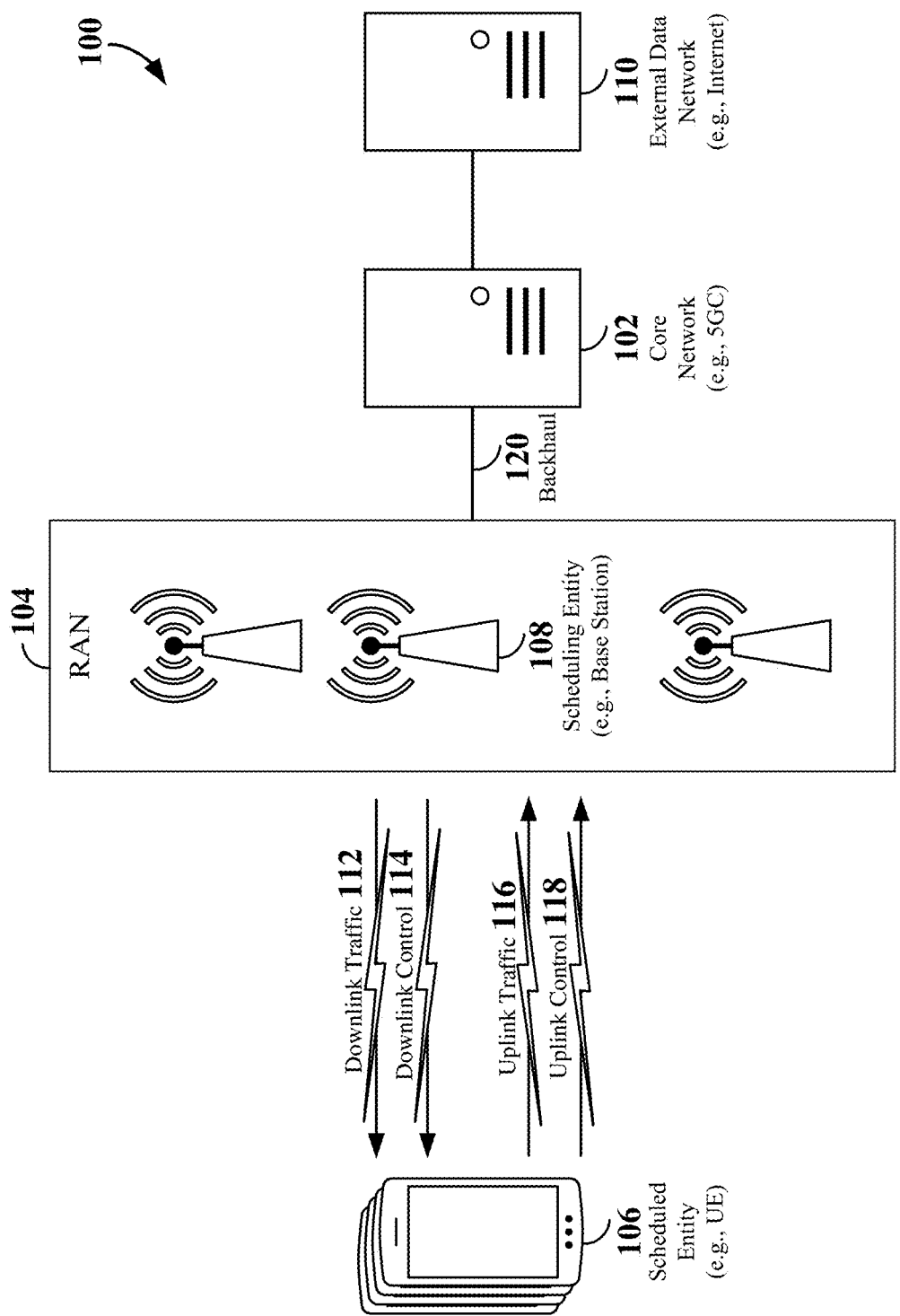
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs for regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Some 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR4-a or FR4-1, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100. The core network may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
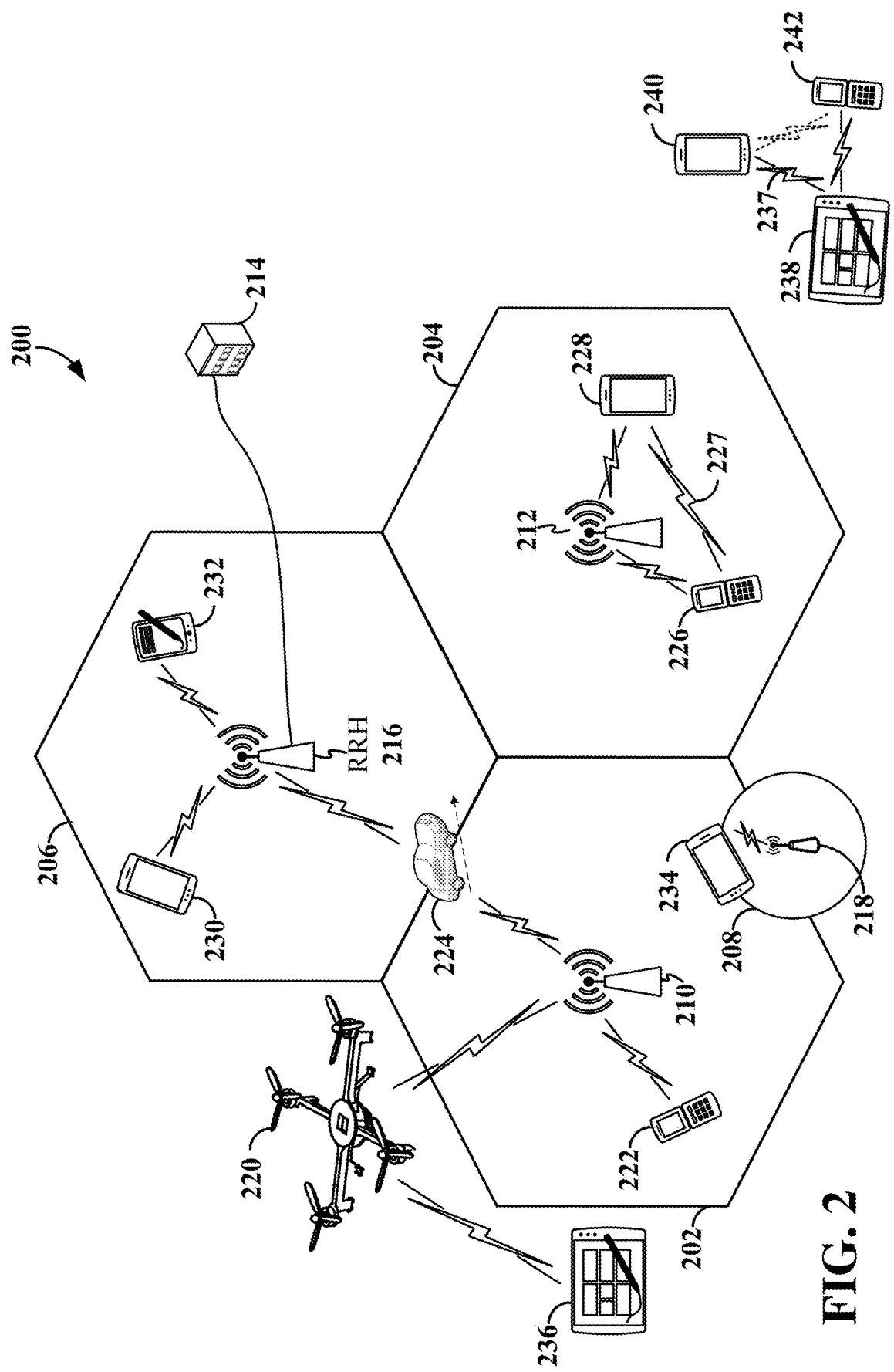
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102

(see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In the RAN 200, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality. The RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a further aspect of the RAN 200, sidelink signals may be used between UEs. Sidelink communications may occur in some scenarios without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. Yet those of ordinary skill in the art that understand the various aspects of the present disclosure may be applied to an SC-FDMA waveform in substantially the same way as described herein below. That is, while some examples of the present disclosure may focus on an OFDM link for clarity, the same principles may be applied as well to SC-FDMA waveforms.

Figure 3:
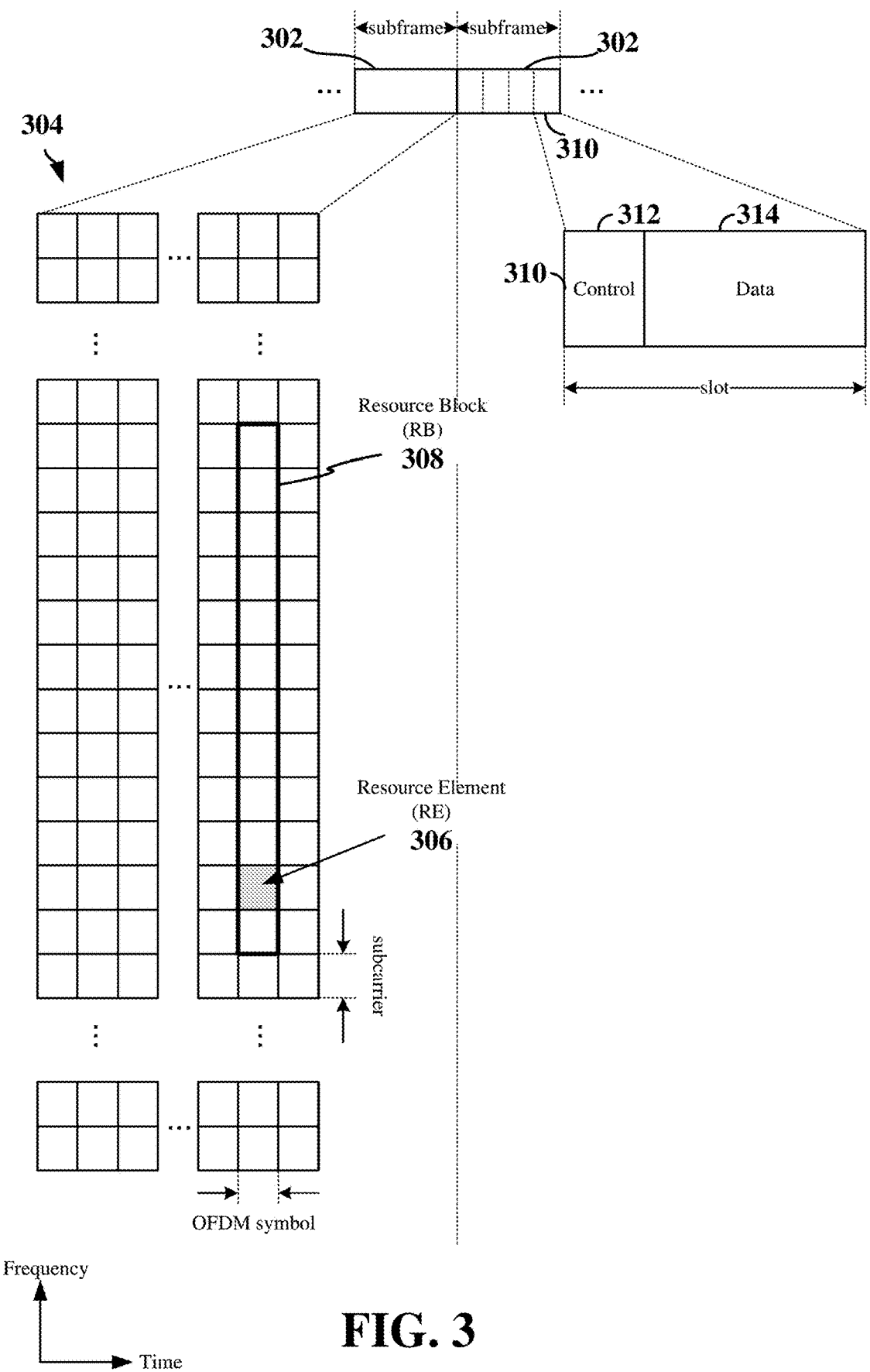
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Subframe structures may be configured in various sizes and shapes for communication using a variety of resources. Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique where integrity of packet transmissions may be checked at a receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions.

UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all channels or carriers that may be utilized between a scheduling entity and scheduled entities, and those of ordinary skill in the art will recognize that other channels or carriers may be utilized in addition to those illustrated, such as other traffic, control, and feedback channels.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 4:
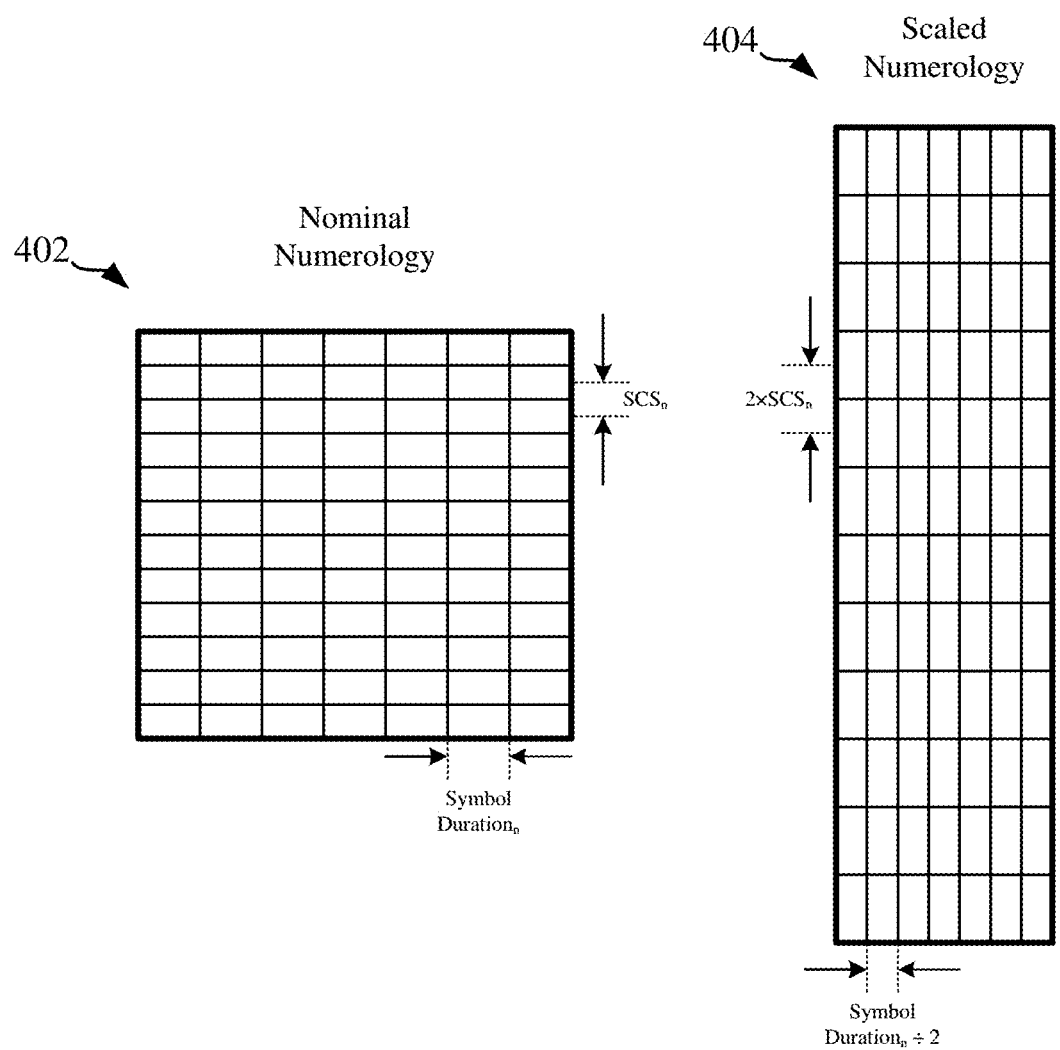
FIG. 4 is a schematic illustration of an OFDM air interface utilizing a scalable numerology according to some aspects of the disclosure.

To illustrate this concept of a scalable numerology, FIG. 4 shows a first RB 402 having a nominal numerology, and a second RB 404 having a scaled numerology. As one example, the first RB 402 may have a 'nominal' subcarrier spacing (SCSn) of 30 kHz, and a 'nominal' symbol duration of 333 μs. Here, in the second RB 404, the scaled numerology includes a scaled SCS of double the nominal SCS, or 2×SCSn=60 kHz. Because this provides twice the bandwidth per symbol, it results in a shortened symbol duration to carry the same information. Thus, in the second RB 404, the scaled numerology includes a scaled symbol duration of half the nominal symbol duration, or (symbol duration) ÷2=167 μs.

Figure 5:
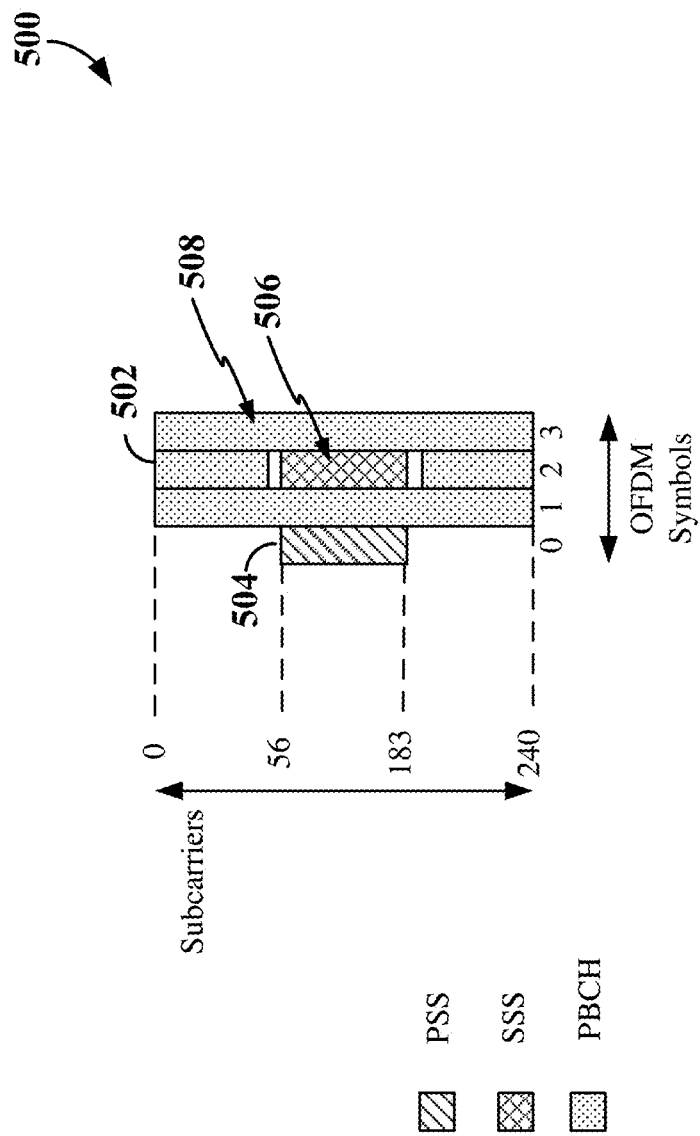
FIG. 5 is a diagram illustrating various broadcast information related to cell access according to some aspects.

FIG. 5 is a diagram illustrating various broadcast information 500 related to cell access according to some aspects. The broadcast information 500 may be transmitted by a RAN entity (e.g., a base station, such as an eNB or gNB) on resources (e.g., time-frequency resources) allocated for the transmission of the broadcast information 500 in a cell. The broadcast information 500 includes an acquisition signal 502 that includes cell identifying information. In some examples, the acquisition signal 502 may include a synchronization signal block (SSB).

The SSB 502 may be transmitted across four OFDM symbols (e.g., symbols 0, 1, 2, and 3) in the time domain and across 20 PRBs (e.g., subcarriers 0 to 240) in the frequency domain within a slot. The particular OFDM symbols containing the SSB 502 may vary based on the numerology (subcarrier spacing) and carrier frequency. In some examples, the SSB 502 may be transmitted within the first four OFDM symbols of the slot. In addition, the SSB 502 may have a periodicity of, for example, 20 ms or other suitable periodicity.

The SSB 502 may include a PSS 504, a SSS 506, and a PBCH 508. The PSS 504 may be transmitted in a first symbol (e.g., Symbol 0) of the SSB, the SSS 506 may be transmitted in a third symbol (e.g., Symbol 2) of the SSB, and the PBCH 508 may be transmitted across the second, third, and fourth symbols (e.g., Symbols 2-4) of the SSB. The PSS 504 may include a PSS sequence selected from a set of PSS sequences. In addition, the SSS 506 may include a SSS sequence selected from a set of SSS sequences. In some examples, the PSS/SSS sequences identify the PCI (e.g., the PCI of the cell within which the SSB 502 is transmitted). In some examples, the cell identifying information may include the PCI.

The PBCH 508 may include a master information block (MIB) that includes various system information, along with parameters for decoding a system information block (SIB). The SIB may be, for example, a SystemInformationType1 (SIB1) that may include various additional system information. Collectively, the MIB and SIB1 include the minimum system information (SI) for initial system (cell) access. In addition, the PBCH 508 may further include a DMRS interleaved with the PBCH data (e.g., MIB) that facilitates decoding of the PBCH 508. The PBCH DMRS may be transmitted within each of the symbols carrying the PBCH 508. The location of the PBCH DMRS in each symbol may vary in the frequency domain with the PCI.

Figure 6:
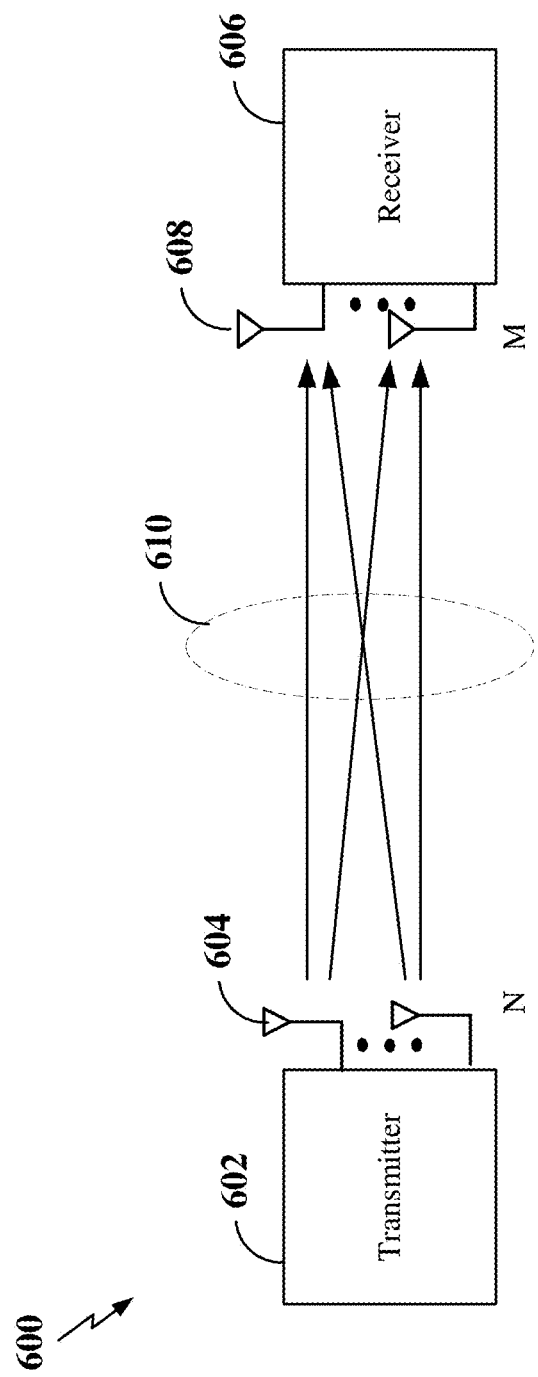
FIG. 6 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 6 illustrates an example of a wireless communication system 600 supporting beamforming and/or MIMO. In a MIMO system, a transmitter 602 includes multiple transmit antennas 604 (e.g., N transmit antennas) and a receiver 606 includes multiple receive antennas 608 (e.g., M receive antennas). Thus, there are N×M signal paths 610 from the transmit antennas 604 to the receive antennas 608. Each of the transmitter 602 and the receiver 606 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers generally corresponds to the rank of the transmission. In general, the rank of the MIMO system 600 is limited by the number of transmit or receive antennas 604 or 608, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 6, a rank-2 spatial multiplexing transmission on a 2×2 MIMO antenna configuration will transmit one data stream from each transmit antenna 604. Each data stream reaches each receive antenna 608 along a different signal path 610. The receiver 606 may then reconstruct the data streams using the received signals from each receive antenna 608.

Beamforming is a signal processing technique that may be used at the transmitter 602 or receiver 606 to shape or steer an antenna beam. Providing directional influence on a communication beam (e.g., a transmit beam or receive beam) along a spatial path between a transmitter 602 and a receiver 606 enables tailored beams for communications. Beamforming may be achieved by combining the signals communicated via antennas 604 or 608 (e.g., antenna elements of an antenna array module) such that some of the signals experience constructive interference while others experience destructive interference. To create the desired constructive/destructive interference, the transmitter 602 or receiver 606 may apply amplitude and/or phase offsets to signals transmitted or received from each of the antennas 604 or 608 associated with the transmitter 602 or receiver 606.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as an SSB or CSI-RS, on each of a plurality of beams in a beam-sweeping manner. The UE may measure the reference signal received power (RSRP) on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

Figure 7:
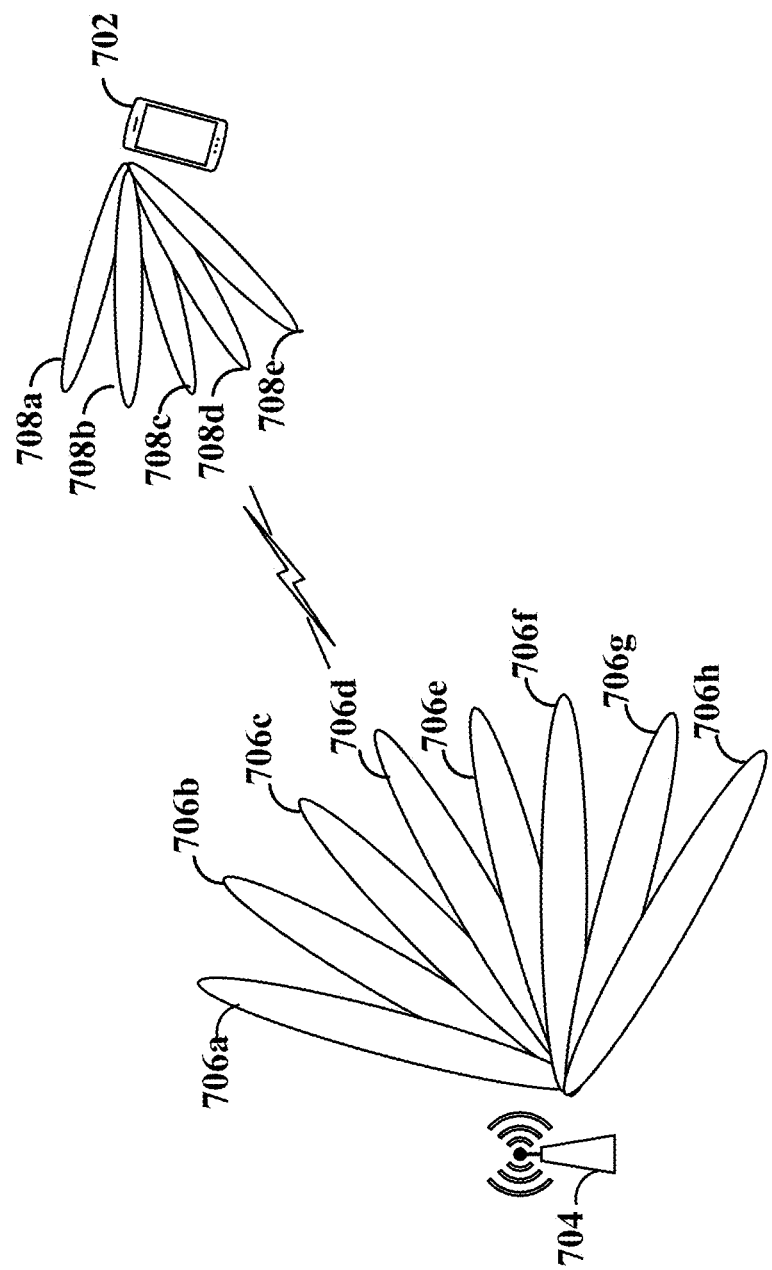
FIG. 7 is a diagram illustrating an example of communication between a radio access network (RAN) entity and a wireless communication device using beamforming according to some aspects.

FIG. 7 is a diagram illustrating communication between a base station 704 and a UE 702 using beamformed signals according to some aspects. The base station 704 may be any of the base stations (e.g., gNBs) or scheduling entities illustrated in FIGS. 1 and/or 3, and the UE 702 may be any of the UEs or scheduled entities illustrated in FIGS. 1 and/or 3.

The base station 704 may generally be capable of communicating with the UE 702 using one or more transmit beams, and the UE 702 may further be capable of communicating with the base station 704 using one or more receive beams. As used herein, the term transmit beam refers to a beam on the base station 704 that may be utilized for downlink or uplink communication with the UE 702. In addition, the term receive beam refers to a beam on the UE 702 that may be utilized for downlink or uplink communication with the base station 704.

In the example shown in FIG. 7, the base station 704 is configured to generate a plurality of transmit beams 706a-706h. One or more of the transmit beams can be associated with a different spatial direction in some scenarios. In addition or alternatively, the UE 702 may be configured to generate a plurality of receive beams 708a-708e, each associated with a different spatial direction. It should be noted that while some beams are illustrated as adjacent to one another, such an arrangement may be different in different aspects. For example, transmit beams 706a-706h transmitted during a same symbol may not be adjacent to one another. In some examples, the base station 704 and UE 702 may each transmit more or less beams distributed in all directions (e.g., 370 degrees) and in three-dimensions. In addition, the transmit beams 706a-706h may include beams of varying beam width. For example, the base station 704 may transmit certain signals (e.g., SSBs) on wider beams and other signals (e.g., CSI-RSs) on narrower beams.

The base station 704 and UE 702 may select one or more transmit beams 706a-706h on the base station 704 and one or more receive beams 708a-708e on the UE 702 for communication. Beam selection can occur using uplink and downlink signals between the BS and UE using a beam management procedure. In one example, during initial cell acquisition, the UE 702 may perform a P1 beam management procedure. The PT beam management procedure can include scanning one or more of the plurality of transmit beams 706a-706h on the plurality of receive beams 708a-708e to select a beam pair link (e.g., one of the transmit beams 706a-706h. The P1 procedure may also include selecting one or more of the receive beams 708a-708e) for a physical random access channel (PRACH) procedure for initial access to the cell. For example, periodic SSB beam sweeping may be implemented on the base station 704 at certain intervals (e.g., based on the SSB periodicity, which may be, for example 20 ms). Thus, the base station 704 may be configured to sweep or transmit an SSB on each of a plurality of wider transmit beams 706a-706h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the P1 beam management and/or PRACH procedure, the base station 704 and UE 702 may perform a P2 beam management procedure. A P2 beam management procedure can aid in beam refinement at the base station 704. For example, the base station 704 may be configured to sweep or transmit a CSI-RS on each of a plurality of narrower transmit beams 706a-706h. Each of the narrower CSI-RS beams may be a sub-beam of the selected SSB transmit beam and/or other SSB transmit beams (e.g., within the spatial direction of one or more SSB transmit beams). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 702 is configured to scan the plurality of CSI-RS transmit beams 706a-706h on the plurality of receive beams 708a-708e. The UE 702 then performs beam measurements (e.g., RSRP, SINR, etc.) of the received CSI-RSs on each of the receive beams 708a-708e to determine the respective beam quality of each of the CSI-RS transmit beams 706a-706h as measured on each of the receive beams 708a-708e.

The UE 702 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 706a-706h on one or more of the receive beams 708a-708e to the base station 704. The base station 704 may then select one or more CSI-RS transmit beams on which to communicate downlink and/or uplink control and/or data with the UE 702. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 702 may further select a corresponding receive beam on the UE 702 for each selected serving CSI-RS transmit beam to form a respective beam pair link (BPL) for each selected serving CSI-RS transmit beam. For example, the UE 702 can utilize the beam measurements obtained during the P2 procedure or perform a P3 beam management procedure (e.g., beam refinement procedure) to perform a UE beam scan to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 704 may configure the UE 702 to perform SSB beam measurements. For example, the base station 704 may configure the UE 702 to perform SSB beam measurements and/or CSI-RS beam measurements for beam failure detection (BFD), beam failure recovery (BFR), cell reselection, beam refinement (e.g., a P3 procedure), beam tracking (e.g., for a mobile UE 702 and/or base station 704), or other beam optimization purpose.

In addition, when the channel is reciprocal, the transmit and receive beams may be selected using an uplink beam management scheme. In an example, the UE 702 may be configured to sweep or transmit on each of a plurality of receive beams 708a-708e. For example, the UE 702 may transmit an SRS on each beam in the different beam directions. In addition, the base station 704 may be configured to receive the uplink beam reference signals on a plurality of transmit beams 706a-706h. The base station 704 then performs beam measurements (e.g., RSRP, SINR, etc.) of the beam reference signals on each of the transmit beams 706a-706h to determine the respective beam quality of each of the receive beams 708a-708e as measured on each of the transmit beams 706a-706h.

The base station 704 may then select one or more transmit beams on which to communicate downlink and/or uplink control and/or data with the UE 702. In some examples, the selected transmit beam(s) have the highest RSRP. The UE 702 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 706d) on the base station 704 and a single receive beam (e.g., beam 708c) on the UE may form a single BPL used for communication between the base station 704 and the UE 702. In another example, multiple CSI-RS transmit beams (e.g., beams 706c, 706d, and 706e) on the base station 704 and a single receive beam (e.g., beam 708c) on the UE 702 may form respective BPLs used for communication between the base station 704 and the UE 702. In another example, multiple CSI-RS transmit beams (e.g., beams 706c, 706d, and 706e) on the base station 704 and multiple receive beams (e.g., beams 708c and 708d) on the UE 702 may form multiple BPLs used for communication between the base station 704 and the UE 702. In this example, a first BPL may include transmit beam 706c and receive beam 708c, a second BPL may include transmit beam 708d and receive beam 708c, and a third BPL may include transmit beam 708e and receive beam 708d.

In examples in which the UE 702 utilizes SSBs for beam management (e.g., initial access, beam refinement, beam tracking, or other suitable beam optimization purpose), the UE 702 may obtain a beam quality metric (e.g., RSRP, SINR, etc.) of a transmit beam on a receive beam using solely the SSS of the SSB. In order to identify the best receive beam for a given transmit beam (e.g., a given SSB identified by a given SSB index) based on the measured beam quality metric (e.g., the best beam may have the highest RSRP), the UE 702 may measure the SSS of the same SSB index (e.g., same transmit beam) at different times on different receive beams. Depending on the number of receive beams 708a-708e on the UE 702 and SSB periodicity (e.g., 20 ms or other suitable periodicity), a UE beam scan for receive beam refinement or other receive beam optimization purpose may take a considerable amount of time based on only the SSS.

In various aspects, to enhance and expedite UE beam scans for beam management (e.g., initial access, beam refinement, or other beam optimization procedure), the UE 702 may perform a PBCH-based beam scan. The PBCH-based beam scan may be for each SSB index monitored by the UE 702 (e.g., for each transmit beam for which the UE 702 selects a receive beam to form a BPL therebetween). For example, for each SSB monitored by the UE 702, the UE 702 may obtain a respective beam quality metric on each of two or more respective receive beams using the SSS and a PBCH-based beam reference signal.

In some examples, the PBCH-based beam reference signal corresponds to a DMRS of the PBCH. In some examples, the PBCH-based beam reference signal corresponds to a re-encoded PBCH sequence associated with the PBCH. For example, the re-encoded PBCH sequence may be utilized to de-correlate a received PBCH. In this example, the re-encoded PBCH sequence may be obtained using a prior SSB of the same or different SSB index. In some examples, the PBCH-based beam reference signal may include a re-encoded combined PBCH DMRS and PBCH sequence.

Each symbol carrying the PBCH-based beam reference signal may be utilized by the UE 702 to obtain a respective beam quality metric on a different respective receive beam. For example, the PBCH-based beam reference signal may be carried on two different symbols of the SSB (e.g., symbols 1 and 3, as shown in FIG. 5). Therefore, by measuring the PBCH-based beam reference signal on two different receive beams in each of two different symbols of the SSB in addition to measuring the SSS on a third receive beam in a third symbol of the SSB, a UE beam scan may be expedited by a factor of three times compared to only using the SSS. The expedited UE beam scan may be utilized to enhance both wide beam scans for initial access and UE beam refinement beam scans based on SSB.

In addition, by utilizing PBCH-based beam reference signals to expedite SSB-based UE beam scans, the dependency upon P3 resources for UE beam refinement may be reduced. For example, SSB-based UE beam refinement may be applied to any beam from any cell, which is not possible with CSI-RS-based P3 resources as these resources are dedicated for the serving cell.

Figure 8:
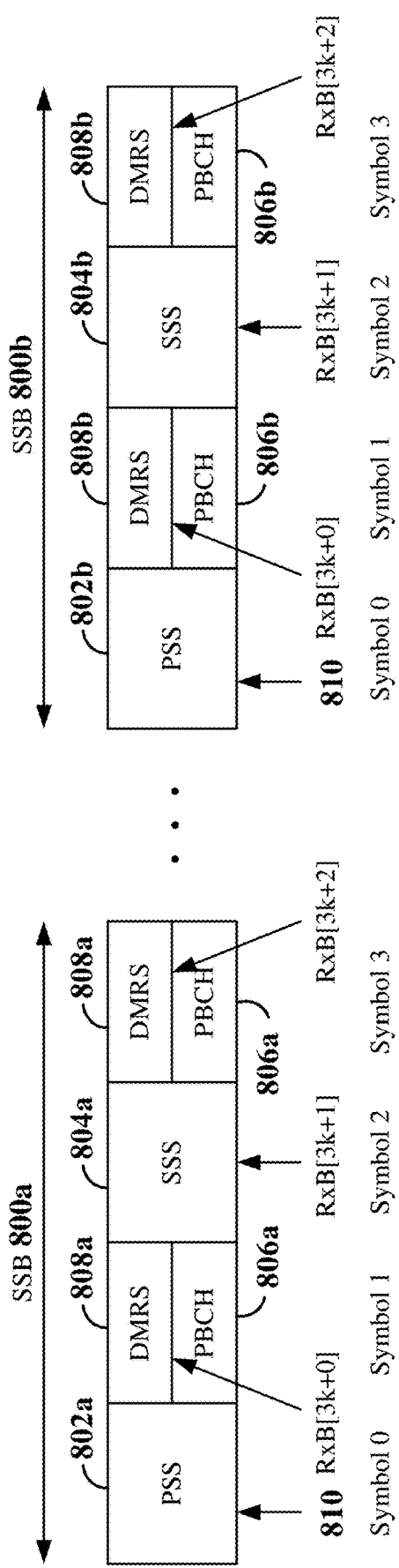
FIG. 8 is a diagram illustrating an example of SSB transmissions used for UE beam scans at a wireless communication device according to some aspects.

FIG. 8 is a diagram illustrating an example of SSB transmissions used for UE beam scans at a wireless communication device according to some aspects. In the example shown in FIG. 8, each SSB transmission (e.g., SSB 800a and SSB 800b) has the same SSB index corresponding to a same transmit beam of a base station. Each SSB 800a and 800b is transmitted across four OFDM symbols 810 (e.g., Symbol 0, Symbol 1, Symbol 2, and Symbol 3) of a respective slot. For example, SSB 800a may be transmitted in a first slot and SSB 800b may be transmitted in a second slot subsequent to the first slot based on the periodicity of SSB transmissions (e.g., 20 ms).

Each SSB 800a and 800b includes a respective PSS 802a and 802b transmitted in the first symbol 810 (Symbol 0), a respective SSS 804a and 804b transmitted in the third symbol 810 (Symbol 2), and a respective PBCH 806a and 806b. Each PBCH 806a and 806b may be transmitted across three symbols 810 (Symbols 1, 2, and 3). However, for simplicity, each PBCH 806a and 806b is illustrated as being transmitted in Symbols 1 and 3. A respective PBCH DMRS 808a and 808b may further be transmitted together with the PBCH 806a and 806b to enable decoding of the MIB in the PBCH.

For each SSB index monitored by a UE, the UE may identify a list of UE receive beams on which to measure the SSB corresponding to the monitored SSB index during a UE beam scan. The list of receive beams may be denoted by RxB[n], n=0, 1, . . . , N. The UE may utilize a different receive beam to measure respective beam reference signals within each SSB 800a and 800b. For example, a first beam reference signal in each SSB 800a and 800b of the same SSB index may include the SSS (e.g., SSS 804a and SSS 804b). In addition, a second beam reference signal in each SSB 800a and 800b of the same SSB index may include a PBCH-based beam reference signal. In the example shown in FIG. 8, the PBCH-based beam reference signal may include the PBCH DMRS 808a and 808b. Since the PBCH DMRS is spread across two symbols 810 (e.g., Symbols 1 and 3), the UE may utilize a different receive beam to measure each symbol of the PBCH DMRS.

For example, for SSB 800a, the UE may utilize a different receive beam from the list to obtain a respective beam quality metric (e.g., RSRP or SINR) of the SSS 804a and each symbol of the PBCH DMRS 808a. In the example shown in FIG. 8, the UE may utilize receive beam RxB[3k+0] to obtain a first beam quality metric of the PBCH DMRS 808a on Symbol 1, receive beam RxB[3k−P1] to obtain a second beam quality metric of the SSS 804a, and receive beam RxB[3k+2] to obtain a third beam metric of the PBCH DMRS 808a on Symbol 3. Here, k indicates the SSB instance and is incremented for each SSB received of the same SSB index (e.g., k=0, 1, N). Similarly, for SSB 800b, the UE may utilize receive beam RxB[3k+0] to obtain a fourth beam quality metric of the PBCH DMRS 808a on Symbol 1, receive beam RxB[3k−1] to obtain a fifth beam quality metric of the SSS 804a, and receive beam RxB[3k+2] to obtain a sixth beam metric of the PBCH DMRS 808a on Symbol 3. From the beam quality metrics obtained on each of the receive beams in the list, the UE may select a particular receive beam to form a BPL with the transmit beam (e.g., the beam corresponding to the SSB index of SSBs 800*a* and 800*b*).

As with other types of beam communications discussed herein, the PBCH-based UE beam scan illustrated in FIG. 8 may be implemented in many mmWave frequency bands. As a few examples of frequency bands, these may include FR2, FR4, FR5, FR4-a, FR4-1, etc. In addition, the PBCH-based UE beam scan shown in FIG. 8 may be implemented for any numerology (e.g., 60 kHz, 120 kHz, 240 kHz, 480 kHz, 960 kHz etc.).

Considering mobility aspects associated with varied frequency beam-based communications, broadcast channel configurations can vary. In some examples, a re-encoded PBCH sequence (or a re-encoded combined PBCH DMRS and PBCH sequence) may be obtained using a prior SSB of the same or different SSB index. For example, since the payload of the PBCH changes infrequently in a cell, the re-encoded PBCH sequence or re-encoded PBCH DRMS and PBCH sequence may be obtained by re-encoding a previously decoded PBCH payload with SSB-related modifications. In some examples, the SSB-related modifications may include replacing one or more fields of the PBCH with a known bit sequence prior to re-encoding.

FIG. 9 is a diagram illustrating an example of a PBCH payload 900 according to some aspects. The PBCH payload 900 may include the subframe number (SFN), half-frame indicator, one or more most significant bits (MSB) of the SSB index, a raster offset, a default downlink (DL) numerology, remaining system information (RMSI) configuration information, a front loaded DMRS indicator, a cell barring indicator, a cell reselection indicator, a reserved field, and a cyclic redundancy check (CRC) for a total of 56 bits.

In some examples, the replaced PBCH fields may include the SFN, the half-frame indicator, and the three MSB of the SSB index. For example, upon decoding a prior (or initially received) SSB, the UE may replace the bits corresponding to the SFN, half-frame indicator, and the three MSB of the SSB index with a known bit sequence to produce a modified PBCH payload for re-encoding. The UE may then re-encode the modified PBCH payload to obtain a re-encoded PBCH sequence (or PBCH DMRS and PBCH sequence) that may be denoted d(0), d(1), d(2), d(55). The re-encoded PBCH sequence or re-encoded PBCH DRMS and PBCH sequence may then be utilized by the UE as a reference sequence to de-correlate a subsequently received PBCH symbol of a monitored SSB to generate one or more beam quality metrics, such as RSRP or SINR.

Figure 10:
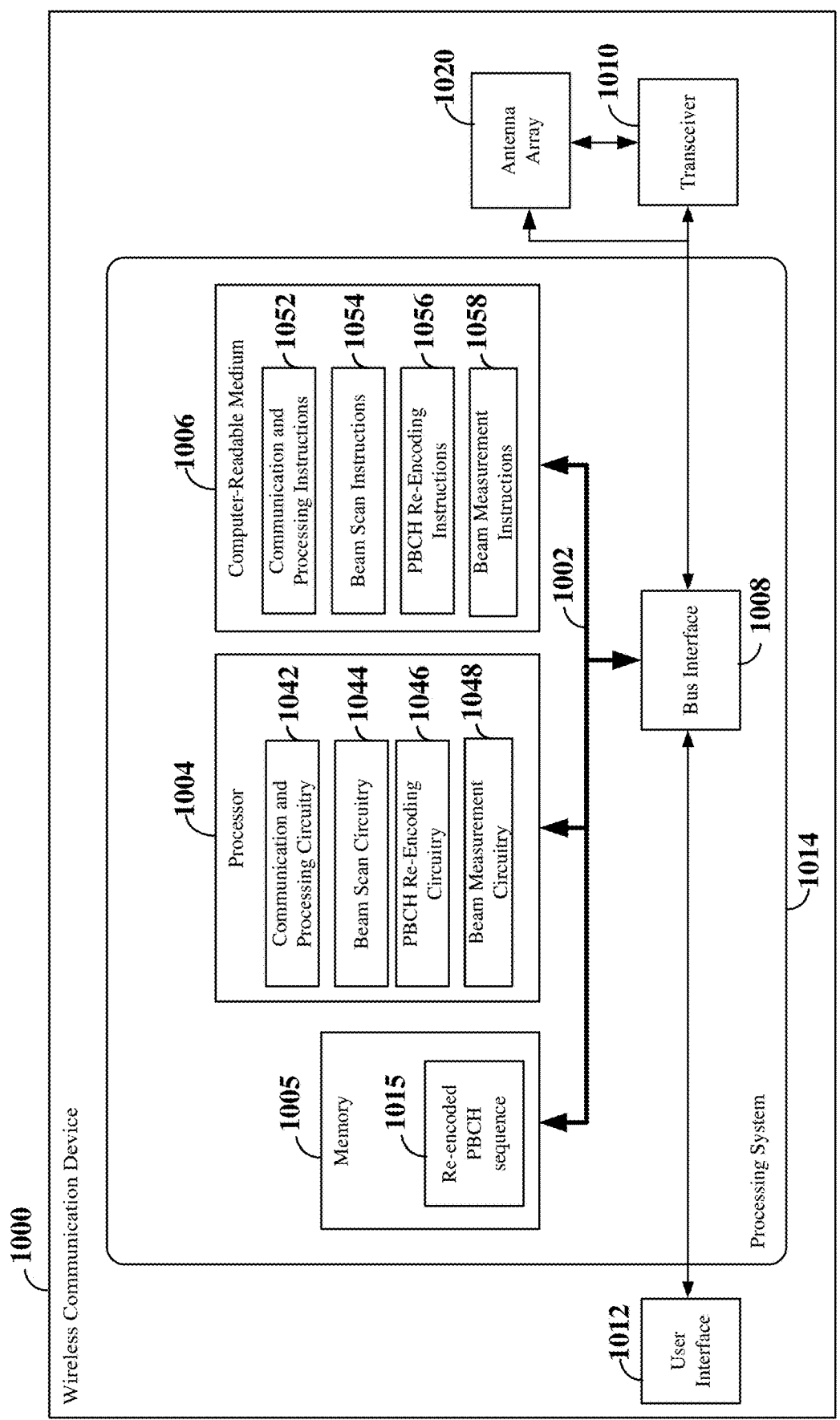
FIG. 10 is a block diagram illustrating an example of a hardware implementation for a wireless communication device employing a processing system according to some aspects.

FIG. 10 is a conceptual diagram illustrating an example of a hardware implementation for an exemplary wireless communication device employing a processing system 1014. For example, the wireless communication device 1000 may be a UE or other scheduled entity as illustrated in any one or more of FIGS. 1, 2, 6 and/or 7.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in a wireless communication device 1000, may be used to implement any one or more of the processes described below in connection with FIG. 10.

The processor 1004 may in some instances be implemented via a baseband or modem chip and in other implementations, the processor 1004 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). A user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. In some examples, the computer-readable medium 1006 may be part of the memory 1005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042, configured to communicate with a RAN entity (e.g., a base station, such as a gNB). In some examples, the communication and processing circuitry 1042 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1042 may be configured to receive and process downlink beamformed signals at a mmWave frequency or a sub-6 GHz frequency via the transceiver 1010 and an antenna array 1020. For example, the communication and processing circuitry 1042 may be configured to receive a beam reference signal on a downlink (transmit) beam of a plurality of transmit beams from the RAN entity during a beam scan. The communication and processing circuitry 1042 may further be configured to execute communication and processing instructions (software) 1052 stored in the computer-readable medium 1006 to implement one or more of the functions described herein.

The processor 1004 may further include beam scan circuitry 1044, configured to control the antenna array 1020 and transceiver 1010 to scan a transmit beam of the RAN entity on a plurality of receive beams of the wireless communication device 1000 to select a selected receive beam of the plurality of receive beams to form a BPL with the transmit beam. In some aspects, the beam scan circuitry 1044 may be configured to utilize SSBs to perform the beam scan for a beam management purpose (e.g., initial access, beam refinement, beam tracking, or other suitable beam optimization purpose).

In some examples, the beam scan circuitry 1044 may be configured to identify a list of receive beams on which to measure beam reference signals within SSBs corresponding to a monitored SSB index during a UE beam scan. The beam scan circuitry 1044 may utilize a different receive beam for each beam reference signal within each SSB of the monitored SSB index. For example, a first beam reference signal in each SSB of the same SSB index may include the SSS. In addition, a second beam reference signal in each SSB of the same SSB index may be associated with a PBCH (e.g., a PBCH-based beam reference signal). For example, the PBCH-based beam reference signal may include at least one of the PBCH DMRS, a re-encoded PBCH sequence associated with the PBCH, or a re-encoded PBCH DMRS and PBCH sequence associated with the PBCH. Since the PBCH (including the PBCH DMRS) is spread across multiple symbols of the SSB, the beam scan circuitry 1044 may utilize a different receive beam for each symbol of the SSB carrying only the PBCH/PBCH DMRS.

In an example, the beam scan circuitry 1044 may utilize a first receive beam for the PBCH DMRS on a first symbol of an SSB, a second receive beam for the SSS on a second symbol of the SSB, and a third receive beam for the PBCH DMRS on a third symbol of the SSB. In another example, the beam scan circuitry 1044 may utilize a first receive beam for a re-encoded PBCH sequence associated with the PBCH on a first symbol of an SSB, a second receive beam for the SSS on a second symbol of the SSB, and a third receive beam for a re-encoded PBCH sequence associated with the PBCH on a third symbol of the SSB. The beam scan circuitry 1044 may further be configured to execute beam scan instructions (software) 1054 stored in the computer-readable medium 1006 to implement one or more of the functions described herein.

The processor 1004 may further include PBCH re-encoding circuitry 1046, configured to produce a re-encoded PBCH sequence 1015. For example, the PBCH re-encoding circuitry 1046 may be configured to use a prior received SSB to obtain the re-encoded PBCH sequence. In some examples, the PBCH re-encoding circuitry 1046 may decode the PBCH of the prior SSB to produce a PBCH payload. The PBCH re-encoding circuitry 1046 may further be configured to replace one or more fields of the PBCH payload with a known bit sequence to produce a modified PBCH payload. For example, the PBCH re-encoding circuitry 1046 may be configured to replace the SFN, half-frame indicator, and three MSB of the SSB index with the known bit sequence. The PBCH re-encoding circuitry 1046 may then re-encode the modified PBCH payload to obtain the re-encoded PBCH sequence 1015. The PBCH re-encoding circuitry 1046 may further be configured to execute PBCH re-encoding instructions (software) 1056 stored in the computer-readable medium 1006 to implement one or more of the functions described herein.

The processor 1004 may further include beam measurement circuitry 1048, configured to operate together with the beam scan circuitry 1044 to obtain a respective beam quality metric of each monitored transmit beam (e.g., each SSB index) on each of the receive beams in the list. For example, the beam measurement circuitry 1048 may further be configured to measure a respective RSRP or other suitable beam measurement (e.g., SINR or RSRQ) on each of the plurality of receive beams in the list of receive beams during the beam scan of the transmit beam. In some examples, the beam measurement circuitry 1048 may be configured to utilize the re-encoded PBCH sequence 1015 to de-correlate a received PBCH symbol in a monitored SSB to generate the beam quality metric for the PBCH symbol. The beam measurement circuitry 1048 may further be configured to execute beam measurement instructions (software) 1058 stored in the computer-readable medium 1006 to implement one or more of the functions described herein.

Figure 11:
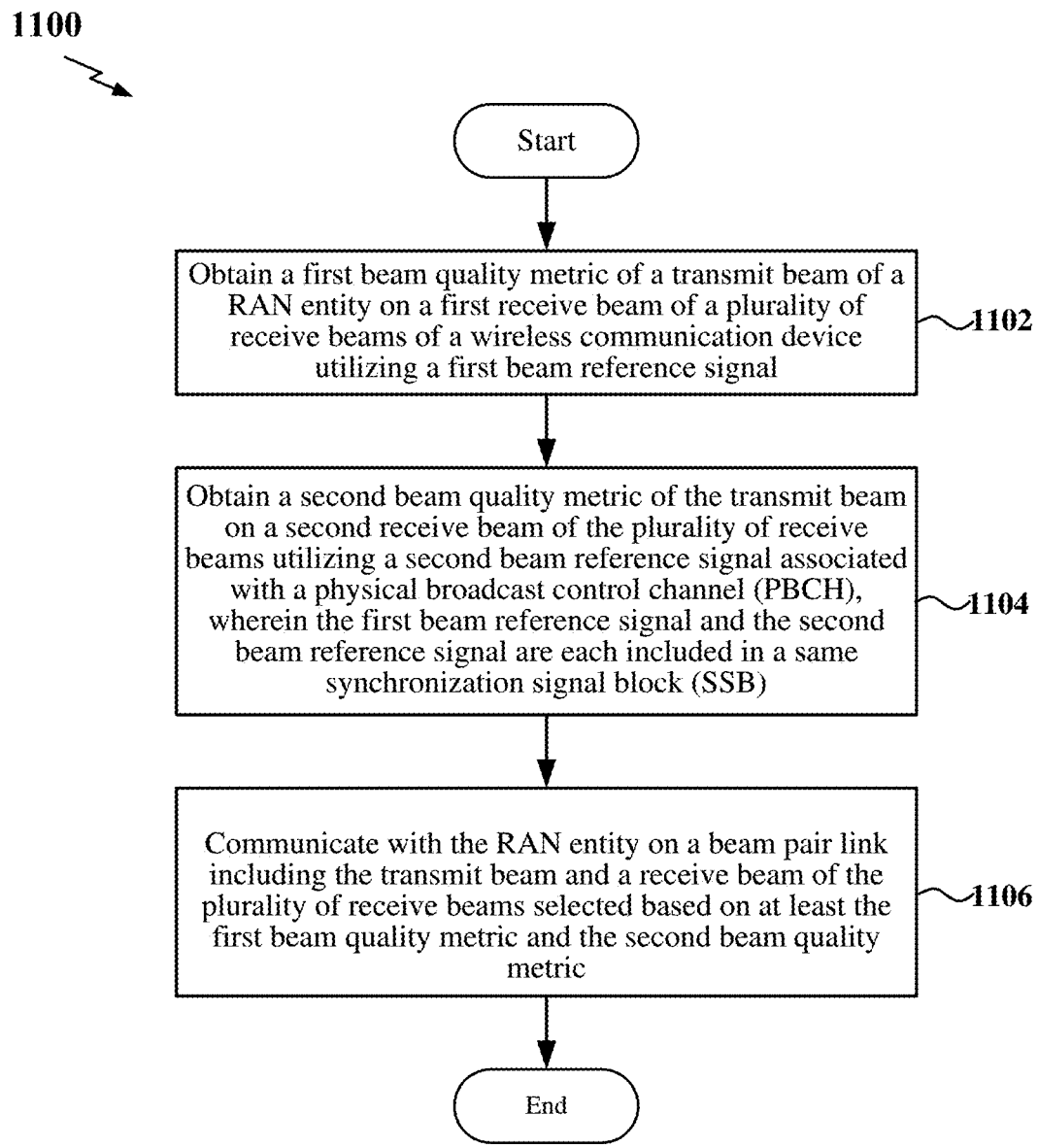
FIG. 11 is a flow chart of an exemplary method for performing beam scan at a wireless communication device according to some aspects.

FIG. 11 is a flow chart 1100 of a method for a wireless communication device to perform a beam scan according to some aspects. As described below, some or all illustrated features may be omitted in a particular implementation within the scope of the present disclosure, and some illustrated features may not be required for implementation of all embodiments. In some examples, the method may be performed by the wireless communication device 1000, as described above and illustrated in FIG. 10, by a processor or processing system, or by any suitable means for carrying out the described functions.

At block 1102, the wireless communication device may obtain a first beam quality metric of a transmit beam (e.g., downlink beam) of a radio access network (RAN) entity (e.g., a base station, such as a gNB) on a first receive beam of a plurality of receive beams of the wireless communication device utilizing a first beam reference signal. The transmit beam may be associated, for example, with a synchronization signal block (SSB) index. In some examples, the first beam reference signal includes a secondary synchronization signal (SSS) of an SSB of the SSB index. In some examples, the first beam quality metric includes an RSRP or SINR. For example, the beam scan circuitry 1144, together with the beam measurement circuitry 1148, antenna array 1120, and transceiver 1110, shown and described above in connection with FIG. 11 may provide a means to obtain the first beam quality metric of the transmit beam.

At block 1104, the wireless communication device may obtain a second beam quality metric of the transmit beam on a second receive beam of the plurality of receive beams utilizing a second beam reference signal associated with a physical broadcast control channel (PBCH). Here, the first beam reference signal and the second beam reference signal are each included in the same SSB. In some examples, the second beam reference signal includes a demodulation reference signal of the PBCH. In some examples, the second beam reference signal includes a re-encoded PBCH sequence or a re-encoded PBCH DMRS and PBCH sequence associated with the PBCH. For example, the re-encoded PBCH sequence may be utilized to de-correlate the received PBCH to generate the second beam quality metric for the PBCH. The first beam quality metric and the second beam quality metric may each include a respective RSRP or a respective SINR.

In some examples, the wireless communication device may obtain the second beam quality metric of the transmit beam on the second receive beam of the plurality of receive beams utilizing a first symbol of the second beam reference signal associated with the PBCH and obtain a third beam quality metric of the transmit beam on a third receive beam of the plurality of receive beams utilizing a second symbol of the second beam reference signal associated with the PBCH. For example, the beam scan circuitry 1044, together with the beam measurement circuitry 1048, antenna array 1020, and transceiver 1010, shown and described above in connection with FIG. 10 may provide a means to obtain the second beam quality metric of the transmit beam.

At block 1106, the wireless communication device may communicate with the RAN entity on a beam pair link including the transmit beam and a receive beam of the plurality of receive beams selected based on at least the first beam quality metric and the second beam quality metric. In examples in which the wireless communication device further obtains a third beam quality metric of the transmit beam on a third receive beam of the wireless communication device on a different symbol of the second beam reference signal, the wireless communication device may select the selected receive beam based on at least the first beam quality metric, the second beam quality metric, and the third beam quality metric. In an aspect, the wireless communication device may communicate with the RAN entity on the transmit beam within a millimeter wave frequency band, such as FR2, etc. The wireless communication device may further communicate with the RAN entity utilizing a numerology of a plurality of numerologies (e.g., 60 kHz, 120 kHz, 240 kHz, etc). For example, the beam scan circuitry 1044, together with the transceiver 1010 and antenna array 1030, shown and described above in connection with FIG. 10 may provide a means to communicate with the RAN entity on the beam pair link.

Figure 12:
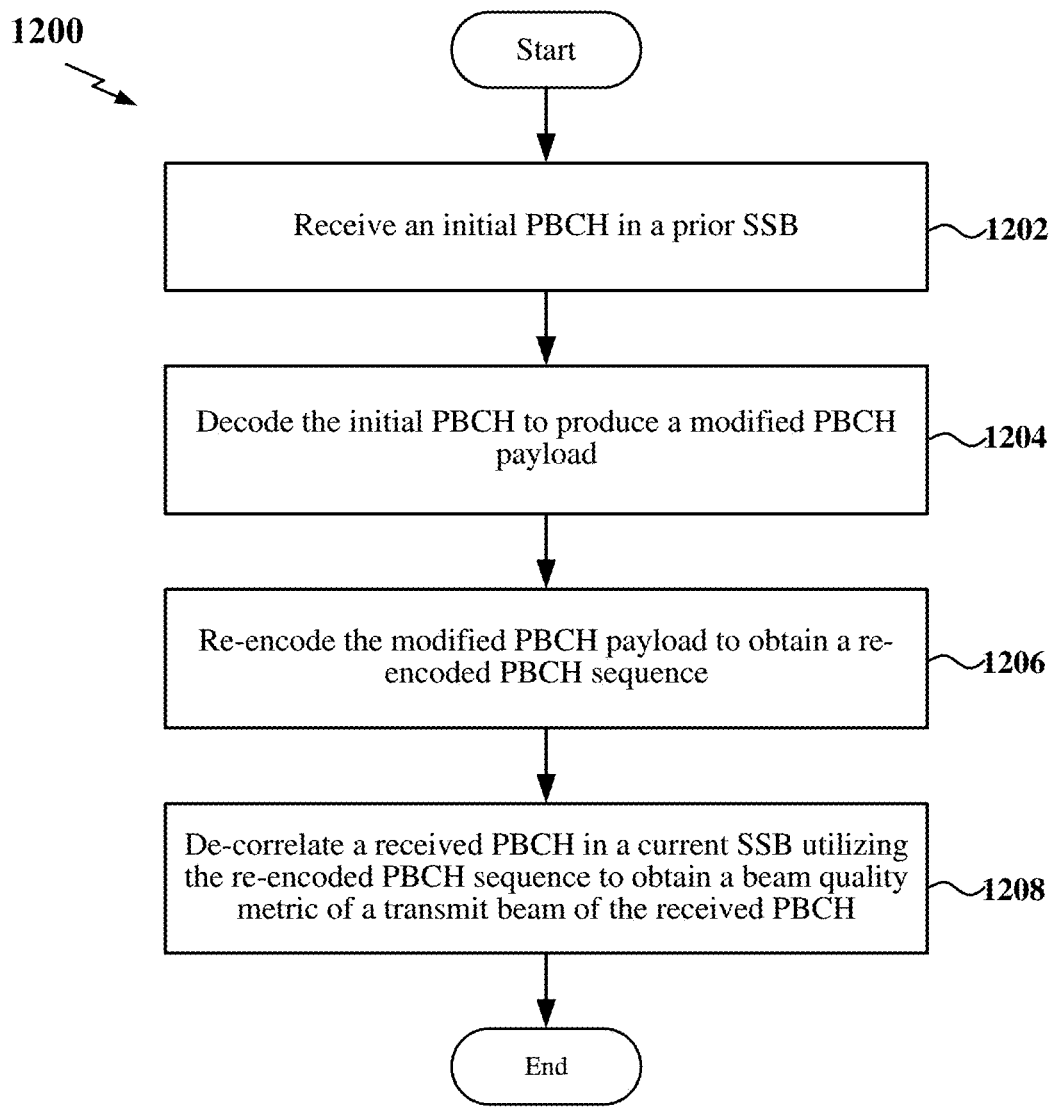
FIG. 12 is a flow chart of another exemplary method for performing a beam scan a wireless communication device according to some aspects.

FIG. 12 is a flow chart 1200 of another method for a wireless communication device to perform a beam scan according to some aspects. As described below, some or all illustrated features may be omitted in a particular implementation within the scope of the present disclosure, and some illustrated features may not be required for implementation of all embodiments. In some examples, the method may be performed by the wireless communication device 1000, as described above and illustrated in FIG. 10, by a processor or processing system, or by any suitable means for carrying out the described functions.

At block 1202, the wireless communication device may receive an initial PBCH in a prior SSB. The prior SSB may have the same SSB index or a different SSB index than a monitored SSB index. In some examples, the communication and processing circuitry 1042, together with the transceiver 1010 and antenna array 1020, shown and described above in connection with FIG. 10 may provide a means to receive the initial SSB.

At block 1204, the wireless communication device may decode the initial PBCH to produce a modified PBCH payload. In some examples, the wireless communication device may replace a subframe number, a half-frame indicator, and at least a portion of an SSB index from the initial PBCH with a predetermined bit sequence to produce the modified PBCH payload. For example, the PBCH re-encoding circuitry 1046 shown and described above in connection with FIG. 10 may provide a means to decode the initial PBCH to produce the modified PBCH payload.

At block 1206, the wireless communication device may re-encode the modified PBCH payload to obtain a re-encoded PBCH sequence. For example, the PBCH re-encoding circuitry 1046 shown and described above in connection with FIG. 10 may provide a means to re-encode the modified PBCH payload to obtain the re-encoded PBCH sequence.

At block 1208, the wireless communication device may de-correlate a received PBCH in a current SSB of the monitored SSB index utilizing the re-encoded PBCH sequence to obtain a beam quality metric of a transmit beam of the received PBCH. For example, the beam measurement circuitry 1048, together with the beam scan circuitry 1044, communication and processing circuitry 1042, transceiver 1010, and antenna array 1020, may provide a means to de-correlate the received PBCH utilizing the re-encoded PBCH sequence to obtain the beam quality metric.

In one configuration, the wireless communication device 1000 includes means for performing the various functions and processes described in relation to FIGS. 11 and 12. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 6, and/or 7, and utilizing, for example, the processes and/or algorithms described herein in relation to FIGS. 11 and 12.

The processes shown in FIGS. 11 and 12 may include additional aspects, such as any single aspect or any combination of aspects described below and/or in connection with one or more other processes described elsewhere herein.

Aspect 1: A method for wireless communication at a wireless communication device (e.g., a UE) in a wireless communication network, the method comprising: obtaining a first beam quality metric associated with a transmit beam of a radio access network (RAN) entity via a first receive beam of a plurality of receive beams of the wireless communication device utilizing a first beam reference signal; obtaining a second beam quality metric associated with the transmit beam on a second receive beam of the plurality of receive beams utilizing a second beam reference signal associated with a physical broadcast control channel (PBCH), wherein the first beam reference signal and the second beam reference signal are associated with a same synchronization signal block (SSB); and communicating with the RAN entity on a beam pair link comprising the transmit beam and a receive beam of the plurality of receive beams selected based on at least the first beam quality metric and the second beam quality metric.

Aspect 2: The method of aspect 1, wherein the first beam reference signal comprises a secondary synchronization signal.

Aspect 3: The method of aspect 1 or 2, wherein the second beam reference signal comprises a demodulation reference signal (DMRS) of the PBCH.

Aspect 4: The method of aspect 1 or 2, wherein the second beam reference signal comprises a re-encoded PBCH sequence or a re-encoded PBCH DMRS and PBCH sequence associated with the PBCH.

Aspect 5: The method of any of aspects 1 through 4, wherein the obtaining the second beam quality metric of the transmit beam on the second receive beam of the plurality of receive beams utilizing the second beam reference signal associated with the PBCH further comprises: receiving an initial PBCH in a prior SSB; decoding the initial PBCH to produce a modified PBCH payload; re-encoding the modified PBCH payload to obtain a re-encoded PBCH sequence; and de-correlating the PBCH utilizing the re-encoded PBCH sequence to obtain the second beam quality metric.

Aspect 6: The method of any of aspects 1 through 5, wherein the obtaining the second beam quality metric of the transmit beam on the second receive beam of the plurality of receive beams utilizing the second beam reference signal associated with the PBCH further comprises: receiving an initial PBCH in a prior SSB; decoding the initial PBCH to produce a decoded PBCH; replacing a subframe number, a half-frame indicator, and at least a portion of an SSB index from the decoded PBCH with a predetermined bit sequence to produce a modified PBCH payload; re-encoding the modified PBCH payload to obtain a re-encoded PBCH sequence; and de-correlating the PBCH utilizing the re-encoded PBCH sequence to obtain the second beam quality metric.

Aspect 7: The method of any of aspects 1 through 6, wherein the obtaining the second beam quality metric of the transmit beam on the second receive beam of the plurality of receive beams utilizing the second beam reference signal associated with the PBCH comprises: obtaining the second beam quality metric of the transmit beam on the second receive beam of the plurality of receive beams utilizing a first symbol of the second beam reference signal associated with the PBCH; and obtaining a third beam quality metric of the transmit beam on a third receive beam of the plurality of receive beams utilizing a second symbol of the second beam reference signal associated with the PBCH.

Aspect 8: The method of aspect 7, further comprising: selecting the selected receive beam of the plurality of receive beams based on at least the first beam quality metric, the second beam quality metric, and the third beam quality metric.

Aspect 9: The method of any of aspects 1 through 8, wherein the first beam quality metric and the second beam quality metric each comprise a respective reference signal received power (RSRP) or a respective signal-to-interference-plus-noise ratio (SINR).

Aspect 10: The method of any of aspects 1 through 9, wherein the communicating with the RAN entity on the transmit beam of the RAN entity further comprises: communicating with the RAN entity on the transmit beam within a millimeter wave frequency band.

Aspect 11: The method of any of aspects 1 through 10, wherein the communicating with the RAN entity on the transmit beam of the RAN entity further comprises: communicating with the RAN entity utilizing a numerology selected from a plurality of numerologies.

Aspect 12: A wireless communication device in a wireless communication network comprising a wireless transceiver, a memory, and a processor coupled to the wireless transceiver and the memory, the processor and the memory configured to perform a method of any one of aspects 1 through 11.

Aspect 13: A wireless communication device in a wireless communication network comprising at least one means for performing a method of any one of aspects 1 through 11.

Aspect 14: A non-transitory computer-readable medium storing computer-executable code, comprising code for causing a wireless communication device to perform a method of any one of aspects 1 through 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 6, 7, and 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication performed by a wireless communication device, the method comprising:
    obtaining, based on a first beam reference signal, a first beam quality metric associated with a transmit beam associated with a radio access network (RAN) entity via a first receive beam of a plurality of receive beams associated with the wireless communication device;
    obtaining, based on a second beam reference signal associated with a physical broadcast control channel (PBCH), a second beam quality metric associated with the transmit beam on a second receive beam of the plurality of receive beams, wherein the first beam reference signal and the second beam reference signal are associated with a same synchronization signal block (SSB), wherein obtaining the second beam quality metric comprises:
        receiving an initial PBCH in a prior SSB;
        decoding the initial PBCH to produce a modified PBCH payload;
        re-encoding the modified PBCH payload to produce a re-encoded PBCH sequence; and
        de-correlating the PBCH utilizing the re-encoded PBCH sequence to obtain the second beam quality metric; and
    communicating with the RAN entity on a beam pair link, wherein the beam pair link is based on at least the first beam quality metric and the second beam quality metric.

2. The method of claim 1, wherein the first beam reference signal comprises a secondary synchronization signal.

3. The method of claim 2, wherein the second beam reference signal comprises the re-encoded PBCH sequence or a re-encoded PBCH DMRS and the re-encoded PBCH sequence associated with the PBCH.

4. The method of claim 1, wherein decoding the initial PBCH to produce the modified PBCH payload comprises:
    decoding the initial PBCH to produce a decoded PBCH; and
    replacing a subframe number, a half-frame indicator, and at least a portion of an SSB index from the decoded PBCH with a bit sequence to produce the modified PBCH payload.

5. The method of claim 1, wherein the obtaining the second beam quality metric of the transmit beam on the second receive beam of the plurality of receive beams utilizing the second beam reference signal associated with the PBCH comprises:
    obtaining the second beam quality metric of the transmit beam on the second receive beam of the plurality of receive beams utilizing a first symbol of the second beam reference signal associated with the PBCH; and
    obtaining a third beam quality metric of the transmit beam on a third receive beam of the plurality of receive beams utilizing a second symbol of the second beam reference signal associated with the PBCH.

6. The method of claim 5, wherein a receive beam of the beam pair link is based on at least the first beam quality metric, the second beam quality metric, and the third beam quality metric.

7. The method of claim 1, wherein the first beam quality metric and the second beam quality metric each comprise a respective reference signal received power (RSRP) or a respective signal-to-interference-plus-noise ratio (SINR).

8. The method of claim 1, wherein communicating with the RAN entity on the transmit beam of the RAN entity comprises:
    communicating with the RAN entity on the transmit beam within a millimeter wave frequency band.

9. The method of claim 1, wherein communicating with the RAN entity on the transmit beam of the RAN entity comprises:
    communicating with the RAN entity utilizing a numerology selected from a plurality of numerologies.

10. A wireless communication device for wireless communication, comprising:
    a wireless transceiver;
    a memory; and
    a processor coupled to the wireless transceiver and the memory, wherein the processor is configured to:

obtain, based on a first beam reference signal, a first beam quality metric associated with a transmit beam associated with a radio access network (RAN) entity via a first receive beam of a plurality of receive beams associated with the wireless communication device;

obtain, based on a second beam reference signal associated with a physical broadcast control channel (PBCH), a second beam quality metric associated with the transmit beam on a second receive beam of the plurality of receive beams, wherein the first beam reference signal and the second beam reference signal are associated with a same synchronization signal block (SSB), wherein, to obtain the second beam quality metric, the processor is configured to:
receive an initial PBCH in a prior SSB;
decode the initial PBCH to produce a modified PBCH payload;
re-encode the modified PBCH payload to produce a re-encoded PBCH sequence; and
de-correlate the PBCH utilizing the re-encoded PBCH sequence to obtain the second beam quality metric; and communicate with the RAN entity on a beam pair link, wherein the beam pair link is based on at least the first beam quality metric and the second beam quality metric.

11. The wireless communication device of claim 10, wherein the first beam reference signal comprises a secondary synchronization signal.

12. The wireless communication device of claim 11, wherein the second beam reference signal comprises the re-encoded PBCH sequence or a re-encoded PBCH DMRS and the re-encoded PBCH sequence associated with the PBCH.

13. The wireless communication device of claim 10, wherein the processor is further configured to:
decode the initial PBCH to produce a decoded PBCH; and
replace a subframe number, a half-frame indicator, and at least a portion of an SSB index from the decoded PBCH with a bit sequence to produce the modified PBCH payload.

14. The wireless communication device of claim 10, wherein the processor is further configured to:
obtain the second beam quality metric of the transmit beam on the second receive beam of the plurality of receive beams utilizing a first symbol of the second beam reference signal associated with the PBCH; and
obtain a third beam quality metric of the transmit beam on a third receive beam of the plurality of receive beams utilizing a second symbol of the second beam reference signal associated with the PBCH.

15. The wireless communication device of claim 14, wherein a receive beam of the beam pair link is based on at least the first beam quality metric, the second beam quality metric, and the third beam quality metric.

16. The wireless communication device of claim 10, wherein the first beam quality metric and the second beam quality metric each comprise a respective reference signal received power (RSRP) or a respective signal-to-interference-plus-noise ratio (SINR).

17. The wireless communication device of claim 10, wherein the processor is further configured to:
communicate with the RAN entity on the transmit beam within a millimeter wave frequency band.

18. A wireless communication device for wireless communication, comprising:
means for obtaining, based on a first beam reference signal, a first beam quality metric associated with a transmit beam associated with a radio access network (RAN) entity via a first receive beam of a plurality receive beams of associated with the wireless communication device;
means for obtaining, based on a second beam reference signal associated with a physical broadcast control channel (PBCH), a second beam quality metric associated with the transmit beam on a second receive beam of the plurality of receive beams, wherein the first beam reference signal and the second beam reference signal are associated with a same synchronization signal block (SSB), wherein the means for obtaining the second beam quality metric comprises:
means for receiving an initial PBCH in a prior SSB;
means for decoding the initial PBCH to produce a modified PBCH payload;
means for re-encoding the modified PBCH payload to produce a re-encoded PBCH sequence; and
means for de-correlating the PBCH utilizing the re-encoded PBCH sequence to obtain the second beam quality metric; and
means for communicating with the RAN entity on a beam pair link, wherein the beam pair link is based on at least the first beam quality metric and the second beam quality metric.

19. The wireless communication device of claim 18, wherein the first beam reference signal comprises a secondary synchronization signal.

20. The wireless communication device of claim 19, wherein the second beam reference signal comprises the re-encoded PBCH sequence or a re-encoded PBCH DMRS and the re-encoded PBCH sequence associated with the PBCH.

21. The wireless communication device of claim 18, wherein the means for decoding the initial PBCH to produce a modified PBCH payload further comprises:
means for decoding the initial PBCH to produce a decoded PBCH;
means for replacing a subframe number, a half-frame indicator, and at least a portion of an SSB index from the decoded PBCH with a bit sequence to produce the modified PBCH payload.

22. The wireless communication device of claim 18, wherein the means for obtaining the second beam quality metric of the transmit beam on the second receive beam of the plurality of receive beams utilizing the second beam reference signal associated with the PBCH comprises:
means for obtaining the second beam quality metric of the transmit beam on the second receive beam of the plurality of receive beams utilizing a first symbol of the second beam reference signal associated with the PBCH; and
means for obtaining a third beam quality metric of the transmit beam on a third receive beam of the plurality of receive beams utilizing a second symbol of the second beam reference signal associated with the PBCH.

23. The wireless communication device of claim 22, wherein a receive beam of the beam pair link is based on at least the first beam quality metric, the second beam quality metric, and the third beam quality metric.

24. The wireless communication device of claim 18, wherein the first beam quality metric and the second beam quality metric each comprise a respective reference signal received power (RSRP) or a respective signal-to-interference-plus-noise ratio (SINR).

\* \* \* \* \*